United States Patent
Heinz et al.

(10) Patent No.: US 8,613,885 B2
(45) Date of Patent: Dec. 24, 2013

(54) SOLDER ALLOYS FOR REPAIRING A COMPONENT

(75) Inventors: Paul Heinz, Erlangen (DE); Robert Singer, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 289 days.

(21) Appl. No.: 12/531,189

(22) PCT Filed: Feb. 26, 2008

(86) PCT No.: PCT/EP2008/052324
§ 371 (c)(1),
(2), (4) Date: Sep. 14, 2009

(87) PCT Pub. No.: WO2008/110454
PCT Pub. Date: Sep. 18, 2008

(65) Prior Publication Data
US 2010/0025454 A1    Feb. 4, 2010

(30) Foreign Application Priority Data

Mar. 14, 2007  (EP) ........................... 07005303
Apr. 18, 2007  (EP) ........................... 07007925
Jun. 14, 2007  (EP) ........................... 07011676

(51) Int. Cl.
*C22C 19/00* (2006.01)
*C22C 27/04* (2006.01)
*B23K 31/02* (2006.01)

(52) U.S. Cl.
USPC ........... 420/441; 420/435; 420/430; 420/556; 228/119

(58) Field of Classification Search
USPC ............... 420/441–460, 435, 430, 528, 556; 148/426–429, 435, 437, 425, 423; 228/119
See application file for complete search history.

(56) References Cited

U.S. PATENT DOCUMENTS

| | | | | |
|---|---|---|---|---|
| 2,856,281 A * | 10/1958 | Cremer et al. | .............. | 420/434 |
| 2,901,347 A * | 8/1959 | McGurty et al. | .............. | 420/442 |
| 3,098,743 A | 7/1963 | Mobley | | |
| 3,427,155 A | 2/1969 | Fox | | |
| 3,898,081 A * | 8/1975 | Kukhar | .............. | 420/442 |
| 4,098,450 A | 7/1978 | Keller et al. | | |
| 5,484,740 A * | 1/1996 | Cho | .............. | 438/167 |
| 5,939,204 A * | 8/1999 | Czech | .............. | 428/469 |
| 6,024,792 A | 2/2000 | Kurz et al. | | |
| 2005/0110098 A1 * | 5/2005 | Yoshihara | .............. | 257/371 |

FOREIGN PATENT DOCUMENTS

| | | |
|---|---|---|
| DE | 1215475 | 4/1966 |
| DE | 1758237 A1 | 1/1971 |
| DE | 3306330 A1 | 9/1983 |
| EP | 0486489 B1 | 11/1994 |
| EP | 0412397 B1 | 3/1998 |
| EP | 0834587 A1 | 4/1998 |
| EP | 0892090 A1 | 1/1999 |
| EP | 0786017 B1 | 3/1999 |
| EP | 1293286 A2 | 3/2003 |
| EP | 1319729 A1 | 6/2003 |

(Continued)

*Primary Examiner* — Deborah Yee

(57) ABSTRACT

Many known solder alloys according to prior art utilize silicon or boron as melting point reducers, which, however, form brittle phases that have an undesirable effect on the thermo-mechanical properties. The invention relates to a solder ally that comprises gallium and/or germanium, preferably forms the Y' phase and has improved mechanical properties.

7 Claims, 4 Drawing Sheets

(56) References Cited

FOREIGN PATENT DOCUMENTS

| | | |
|---|---|---|
| EP | 1204776 61 | 6/2004 |
| EP | 1306454 B1 | 10/2004 |
| EP | 1561536 A1 | 8/2005 |
| EP | 1764182 A1 | 3/2007 |
| GB | 838516 A | 6/1960 |
| GB | 2116212 A | 9/1983 |
| JP | 52033860 A * | 3/1977 |
| JP | 59125293 A | 7/1984 |
| JP | 63140794 A | 6/1988 |
| JP | 1107996 A | 4/1989 |
| JP | 408199344 A * | 8/1996 |
| JP | 2005088047 A | 4/2005 |
| WO | WO 9967435 A1 | 12/1999 |
| WO | WO 0044949 A1 | 8/2000 |
| WO | WO 02076669 A | 10/2002 |

* cited by examiner

FIG 5

| Material | Chemical composition in % ||||||||||||
|---|---|---|---|---|---|---|---|---|---|---|---|---|
| | C | Cr | Ni | Co | Mo | W | Ta | Nb | Al | Ti | B | Zr | Hf |
| Ni-base investment casting alloys |
| GTD 222 | 0.10 | 22.5 | Rem. | 19.0 | | 2.0 | 1.0 | | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | 2.9 | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 DS | 0.10 | 14.0 | Rem. | 9.5 | 1.5 | 3.8 | 2.8 | | 3.0 | 4.9 | 0.012 | 0.03 | |
| IN 792 CC | 0.08 | 12.5 | Rem. | 9.0 | 1.9 | 4.1 | 4.1 | | 3.4 | 3.8 | 0.015 | 0.02 | 1.00 |
| IN 792 DS | 0.08 | 12.5 | Rem. | 9.0 | 1.9 | 4.1 | 4.1 | | 3.4 | 3.8 | 0.015 | 0.02 | 1.00 |
| MAR M 002 | 0.15 | 9.0 | Rem. | 10.0 | | 10.0 | 2.5 | | 5.5 | 1.5 | 0.015 | 0.05 | 1.50 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX-2 | <.006 | 8.0 | Rem. | 4.6 | 0.6 | 8.0 | 6.0 | | 5.6 | 1.0 | <.003 | <.0075 | 0.10 |
| CMSX-3 | <.006 | 8.0 | Rem. | 4.6 | 0.6 | 8.0 | 6.0 | | 5.6 | 1.0 | <.003 | <.0075 | 0.10 |
| CMSX-4 | | 6.0 | Rem. | 10.0 | 0.6 | 6.0 | 6.0 | | 5.6 | 1.0 | | Re=3.0 | |
| CMSX-6 | <.015 | 10.0 | Rem. | 5.0 | 3.0 | <.10 | 2.0 | <.10 | 4.9 | 4.8 | <.003 | <.0075 | 0.10 |
| PWA 1480 SX | <.006 | 10.0 | Rem. | 5.0 | | 4.0 | 12.0 | | 5.0 | 1.5 | <.0075 | <.0075 | |
| PWA 1483 SX | 0.07 | 12.2 | Rem. | 9.0 | 1.9 | 3.8 | 5.0 | | 3.6 | 4.2 | 0.0001 | 0.002 | |

SOLDER ALLOYS FOR REPAIRING A COMPONENT

CROSS REFERENCE TO RELATED APPLICATIONS

This application is the US National Stage of International Application No. PCT/EP2008/052324, filed Feb. 26, 2008 and claims the benefit thereof. The International Application claims the benefits of European application No. 07005303.8 EP filed Mar. 14, 2007, European application No. 07007925.6 EP filed Apr. 18, 2007, and European application No. 07011676.9 EP filed Jun. 14, 2007, all of the applications are incorporated by reference herein in their entirety.

FIELD OF THE INVENTION

The invention relates to solder alloys and to a process for repairing a component.

BACKGROUND OF THE INVENTION

It is sometimes necessary to repair components after they have been produced, for example after casting or after they have been used and cracks have formed.

There are various repair processes for this purpose, for example the welding process; in this process, however, it is additionally necessary to melt a substrate material of the component, and this may result in damage particularly to cast and directionally solidified components and in the evaporation of constituents of the substrate material.

A soldering process is carried out at temperatures which are lower than the temperature for the welding process and therefore lower than the melting temperature of the substrate material.

Nevertheless, the solder should have high strength in order that the crack filled with solder or the depression does not weaken the entire component at the high operating temperatures.

SUMMARY OF THE INVENTION

Therefore, it is an object of the invention to provide a solder alloy and a process for repairing a component which overcome the problem mentioned above.

The object is achieved by a solder consisting of a solder alloy and by a process as claimed in the independent claims.

The solder alloy comprises:
gallium (Ga) and/or germanium (Ge), and
optionally
chromium (Cr),
cobalt (Co),
aluminum (Al),
tungsten (W),
nickel (Ni),
and has one of the following compositions,
where G=Ga and/or Ge:
Ni—Cr-G, Ni—Co-G,
Ni—W-G, Ni—Al-G,
Ni—Cr—Co-G,
Ni—Cr—W-G,
Ni—Cr—Al-G,
Ni—Co—W-G,
Ni—Co—Al-G,
Ni—W—Al-G,
Ni—Cr—Co—W-G,
Ni—Cr—Co—Al-G,
Ni—Cr—W—Al-G,
Ni—Co—W—Al-G,
Ni—Cr—Co—W—Al-G.

The dependent claims list further advantageous measures which can advantageously be combined with one another in any desired way, theses measures are the following:
 - the solder alloy does not contain any silicon,
 - the solder alloy does not contain any carbon,
 - the solder alloy does not contain any iron,
 - the solder alloy does not contain any manganese,
 - the solder alloy comprises gallium (Ga) and no germanium (Ge),
 - the solder alloy comprises germanium (Ge) and no gallium (Ga),
 - the solder alloy comprises gallium (Ga) and germanium (Ge),
 - in the solder alloy, the gallium (Ga) or germanium (Ge) content is ≥3% by weight, in particular the gallium or germanium content is 3% by weight,
 - in the solder alloy, the gallium (Ga) or germanium (Ge) content is ≥6% by weight, in particular the gallium or germanium content is 6% by weight,
 - in the solder alloy, the gallium (Ga) or germanium (Ge) content is ≤28% by weight, in particular the gallium or germanium content is ≤18% by weight,
 - in the solder alloy, the gallium (Ga) or germanium (Ge) content is ≤13% by weight, in particular the gallium or germanium content is 13% by weight,
 - in the solder alloy, the gallium (Ga) or germanium (Ge) content is ≤8% by weight, in particular the gallium or germanium content is 8% by weight,
 - the solder alloy comprises 18% by weight to 28% by weight, in particular 20% by weight, germanium (Ge), especially 26% by weight Ge,
 - the solder alloy comprises 21% by weight to 25% by weight germanium (Ge), in particular 23% by weight germanium (Ge),
 - the solder alloy comprises 28% by weight to 35% by weight gallium (Ga),
 - the solder alloy contains chromium (Cr), in particular at least 0.1% by weight,
 - the solder alloy contains cobalt (Co), in particular at least 0.1% by weight,
 - the solder alloy contains aluminum (Al), in particular at least 0.1% by weight,
 - the solder alloy contains tungsten (W), in particular at least 0.1% by weight,
 - the solder alloy contains titanium (Ti), in particular at least 0.1% by weight,
 - the solder alloy contains molybdenum (Mo), in particular at least 0.1% by weight,
 - the solder alloy contains tantalum (Ta), in particular at least 0.1% by weight,
 - the solder alloy consists of nickel (Ni) and gallium (Ga) or germanium (Ge) and a single further alloying element selected exclusively from the group consisting of chromium (Cr), cobalt (Co), tungsten (W) and aluminum (Al),
 - the solder alloy consists of nickel (Ni) and gallium (Ga) or germanium (Ge) and two further alloying elements selected exclusively from the group consisting of chromium (Cr), cobalt (Co), tungsten (W) and aluminum (Al),
 - the solder alloy consists of nickel (Ni) and gallium (Ga) or germanium (Ge) and three further alloying additions selected exclusively from the group consisting of chromium (Cr), cobalt (Co), tungsten (W) and aluminum (Al), the solder alloy consists of nickel (Ni), chromium (Cr), cobalt (Co), tungsten (W), aluminum (Al) and gallium (Ga) or germanium (Ge), the solder alloy does not contain any boron (B) and/or any zirconium (Zr), the solder alloy comprises nickel (Ni) as the highest proportion by weight, the solder alloy comprises nickel (Ni) as the highest proportion by volume, in the solder alloy, the chromium content is 2% by weight-10% by weight, in particular 3% by weight-9% by weight, especially 8% by weight, in the solder alloy, the aluminum content is 1% by weight-5% by weight, in particular 2% by weight-4% by weight, especially 3% by weight, in the solder alloy, the tungsten content is 2% by weight-6% by weight, in particular 3% by weight-5% by weight, especially 4% by weight, in the solder alloy, the cobalt content is 2% by weight-10% by weight, in particular 3% by weight-9% by weight, especially 8% by weight, the solder alloy does not contain any silicon, the solder alloy does not contain any carbon, the solder alloy does not contain any iron, the solder alloy does not contain any manganese, the solder alloy does not contain any tungsten, in the solder alloy, the aluminum content is between 1.0% by weight and 2.0% by weight, in particular 1.5% by weight, in the solder alloy, the tungsten content is between 1% by weight and 3% by weight, in particular 2% by weight, in the solder alloy, the cobalt content is between 3% by weight and 5% by weight, in particular 4% by weight, in the solder alloy, the chromium content is between 3% by weight and 5% by weight, in particular 4% by weight, in the solder alloy, the solder alloy does not comprise any chromium (Cr), in the solder alloy, the solder alloy does not comprise any cobalt (Co), in the solder alloy, the solder alloy does not comprise any aluminum (Al), in the solder alloy, the solder alloy consists of nickel, germanium, tungsten and aluminum, in the solder alloy, the solder alloy consists of nickel, germanium, cobalt and tungsten, in the solder alloy, the solder alloy consists of nickel, germanium, chromium and tungsten, in the solder alloy, the solder alloy consists of nickel, germanium, chromium and cobalt, in the solder alloy, the solder alloy consists of nickel, germanium, cobalt and aluminum, in the solder alloy, the solder alloy consists of nickel, germanium, chromium and aluminum.

The process comprises repairing a component using a solder at a temperature of at least 1140° C., especially at least 1160° C.

The dependent claims list further advantageous measures for the process which can advantageously be combined with one another in any desired way, these measures are the following:

the soldering process is carried out under isothermal conditions, the soldering process is carried out by means of a temperature gradient, the solder is directionally solidified, in particular in single crystal form, the solder is used for the alloys PWA 1483, PWA 1484 or Rene N5, a substrate of the component is directionally solidified, in particular in single crystal form, the temperature is 1160° C., the temperature is 1180° C., the temperature is 1200° C., the temperature is 1230° C., the temperature is 1260° C., the temperature is 1280° C., the temperature is at most 1280° C., in particular at most 1160° C., an overall pressure of less than 10 mbar (1000 Pa), in particular of about 1 mbar (100 Pa), is set in a process chamber, the overall pressure in the process chamber is set at more than 0.1 mbar (10 Pa), in particular at more than 1 mbar (100 Pa), the process chamber is purged with an inert gas, in particular for at least 10 hours, in particular preferably for 48 hours, before the component is heated in the process chamber with the solder, the throughput of the purging operation is between 0.2 l/min and 1 l/min, the throughput of the purging operation is 1 l/min, an inert gas, in particular with a degree of purity of 6.0, is filtered through a gas cleaning cartridge before entering into the process chamber, the duration of the soldering is at least 10 hours, in particular at least 48 hours, the solder (10) is solidified in polycrystalline form (CC), in particular in CC components.

BRIEF DESCRIPTION OF THE DRAWINGS

The invention is explained with reference to the following drawings. In the drawings:

FIG. 5 shows a list of superalloys.

DETAILED DESCRIPTION OF THE INVENTION

Figure 1:
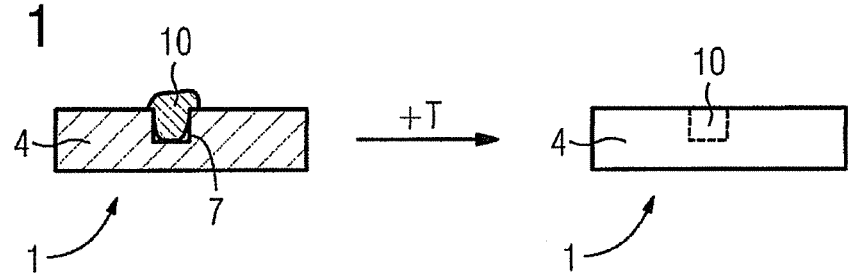
FIG. 1 shows two cross-sectional views of a component during and after treatment with the solder according to the invention.

FIG. 1 shows a component 1 which is treated with a solder 10 consisting of a solder alloy according to the invention.

The component 1 comprises a substrate 4 which, particularly in the case of components for high temperature applications, in particular in the case of turbine blades or vanes 120, 130 (FIG. 2) or combustion chamber elements 155 (FIG. 3) for steam or gas turbines 100 (FIG. 4), consists of a nickel-base or cobalt-base superalloy (FIG. 5).

The solder 10 can preferably be used for all the alloys according to FIG. 5.

These may preferably be the known materials PWA 1483, PWA 1484 or Rene N5.

The solder 10 is also used in blades or vanes for aircraft.

A crack 7 or depression 7 which is to be filled by soldering is present in the substrate 4. The cracks 7 or depressions 7 preferably have a width of about 200 µm and may have a depth of up to 5 mm.

In this case, the solder 10 consisting of a solder alloy is applied into or close to the depression 7, and the solder 10 is melted by heat treatment (+T) below a melting temperature of the substrate 4 and completely fills the depression 7.

The solder alloy 10 is based on nickel and therefore the largest proportion of said alloy is preferably taken up by nickel (Ni).

A binary system of Ni—Ge or Ni—Ga is used with preference.

The gallium (Ga) content is preferably at least 0.1% by weight. The germanium content is likewise preferably at least 0.1% by weight. Even these small proportions influence the soldering behavior of nickel or a nickel alloy.

In addition to a remainder of nickel and gallium and/or germanium, the further constituents of chromium (Cr), cobalt (Co), aluminum (Al) and titanium (Ti), tungsten (W), molybdenum (Mo) or tantalum (Ta) may preferably be present which, if used, are each preferably used in a proportion of at least 0.1% by weight.

The chromium content is preferably in a range from 2% by weight-10% by weight, in particular in a range from 3% by weight-9% by weight, with particularly preferred exemplary embodiments having a chromium content of 4% by weight or 8% by weight, and therefore preferred chromium values are also in a range from 3% by weight to 5% by weight or 7% by weight to 9% by weight, preferably 8% by weight.

The chromium content is also preferably 4% by weight.

The aluminum content is preferably in a range from 1% by weight-5% by weight, particularly preferably in a range from 2% by weight-4% by weight. A particularly good exemplary embodiment has a solder alloy with an aluminum content of 3% by weight.

The tungsten content is preferably in a range from 2% by weight-6% by weight, particularly preferably in a range from 3% by weight-5% by weight. Particularly good results have been achieved with a tungsten content of 4% by weight.

The cobalt content is in a range from 2% by weight-10% by weight, particularly preferably in a range from 3% by weight-9% by weight. Particularly preferred exemplary embodiments have a cobalt content of 4% by weight or 8% by weight, and therefore particularly preferred cobalt contents are 3% by weight to 5% by weight or 7% by weight to 9% by weight, particularly 8% by weight. The cobalt content is also preferably 4% by weight.

The gallium or germanium content is preferably at least 3% by weight, particularly preferably at least 6% by weight. The germanium or gallium content may preferably be limited to a maximum value of 18% by weight. The maximum gallium or germanium content is likewise preferably 13% by weight and very particularly preferably 8% by weight.

The gallium (Ga) content in a nickel-base superalloy as the solder alloy is preferably between 28% by weight and 35% by weight.

The germanium content is preferably between 18% by weight and 28% by weight, in particular 20% by weight, 23% by weight, 26% by weight or 27% by weight, particularly in the case of binary systems, i.e. NiGe20, NiGe23 or NiGe26, in particular for solidification in single crystal form.

The above list of the solder constituents of nickel, chromium, cobalt, tungsten, aluminum, gallium or germanium is preferably conclusive.

Preference is given to using either only gallium or germanium.

The text which follows lists the conclusive composition of advantageously used alloys, where the alloy comprises either only germanium or only gallium or else germanium and gallium (G=gallium and/or germanium, i.e. only Ga or only Ge or Ga and Ge):

Ni—Cr-G
Ni—Co-G
Ni—W-G
Ni—Al-G
Ni—Cr—Co-G
Ni—Cr—W-G
Ni—Cr—Al-G
Ni—Co—W-G
Ni—Co—Al-G
Ni—W—Al-G
Ni—Cr—Co—W-G
Ni—Cr—Co—Al-G
Ni—Cr—W—Al-G
Ni—Co—W—Al-G
Ni—Cr—Co—W—Al-G.

The solder 10 preferably does not contain any boron. Likewise, the solder 10 preferably does not contain any zirconium. The addition of rhenium may likewise preferably be omitted. Likewise, preference is given to not using any hafnium.

The addition or the presence of silicon and/or carbon is preferably avoided since they form brittle phases in the solder.

The addition or the presence of iron and/or manganese is likewise preferably avoided since these elements form low-melting phases or non-oxidizing phases.

The solder 10 may be joined to the substrate 4 of the component 1, 120, 130, 155 in an isothermal process or a temperature gradient process. A gradient process is preferably suitable when the substrate 4 has a directional structure, for example an SX or DS structure, such that the solder 10 then also has a directional structure. However, a directionally solidified structure in the solder may also be provided in an isothermal process.

Equally, the component 1 does not need to have a directionally solidified structure (but rather a CC structure).

The solders in CC substrates of components may likewise be soldered and solidified in a CC structure, the solders then being solidified in polycrystalline form (CC).

The following solders are of particular interest especially for the polycrystalline solidification of the solders:
NiGe
NiGeW4Al3
NiGeCo8W4
NiGeCr8W4
NiGeCr8Co8W4Al3
NiGeCr8Co8
NiGeCo8Al3
NiGeCr8Al3
NiGeCr4Co4W2Al1.5.

In this case, the germanium content is from 20% by weight-30% by weight, in particular 26% by weight or 27% by weight.

During the melting (isothermal process or gradient process), use is preferably made of an inert gas, in particular argon, which reduces the vaporization of chromium from the substrate 4 at the high temperatures, or a reducing gas (argon/hydrogen) is used.

The solder 10 may also be applied to a large area of a surface of a component 1, 120, 130, 155 in order to thicken the substrate 4, in particular in the case of hollow components. The solder 10 is preferably used to fill cracks 7 or depressions 7.

When a solder 10 is soldered in vacuo, which is often carried out when the solder 10 or the component 1, 120, 130, 155 oxidizes, the use of inert gases (Ar, He, Ar/He, $H_2$ . . . )

and/or the use of a vacuum preferably results in the problem of constituents of the component 1, 120, 130, 155 or of the solder 10 vaporizing at an excessively low process pressure.

At an excessively high oxygen partial pressure $p_{O2}$, the solder 10 or the component 1, 120, 130, 155 oxidizes.

The process according to the invention therefore also preferably proposes carrying out the soldering process in vacuo in a process chamber, preferably in a furnace at an oxygen partial pressure $p_{O2}$ of at most $10^{-6}$ mbar ($10^{-4}$ Pa).

The oxygen partial pressure $p_{O2}$ is preferably at least $10^{-7}$ mbar ($10^{-5}$ Pa). The overall process pressure is preferably at most 100 mbar (10 000 Pa), in particular at most 10 mbar (1000 Pa). The overall process pressure is preferably at least 0.1 mbar (10 Pa). Particularly good soldered joins have been achieved at a pressure of 1 mbar (100 Pa).

These pressure values are achieved, in particular, due to the fact that the process chamber has a vacuum in its interior, is preferably permanently pumped out and, before the soldering, is preferably purged with a pure inert gas, preferably argon (Ar) (Ar 5.0, preferably Ar 6.0). This is preferably carried out for at least 10 hours, in particular for 48 hours with a throughflow rate of preferably between 0.2 l/min and 1 l/min.

In this case, preference is given to using argon 6.0 (this means an oxygen content of $5 \times 10^{-7}$ in the process gas) which, however, is preferably filtered through a gas cleaning cartridge, such that the oxygen and water content is reduced by a factor of 100 so as to achieve an oxygen content of $5 \times 10^{-9}$ in the process gas introduced into the process chamber.

Argon is likewise preferably present within the pressure values described above during the soldering operation.

The temperature during the soldering process is at least 1140° C., in particular at least 1160° C. Further advantageous soldering temperatures are 1160° C., 1180° C., 1200° C., 1230° C. and 1260° C. The maximum temperature is preferably 1280° C., in particular at most 1260° C.

The duration of the soldering treatment is preferably at least 10 hours, in particular 48 hours.

Figure 2:
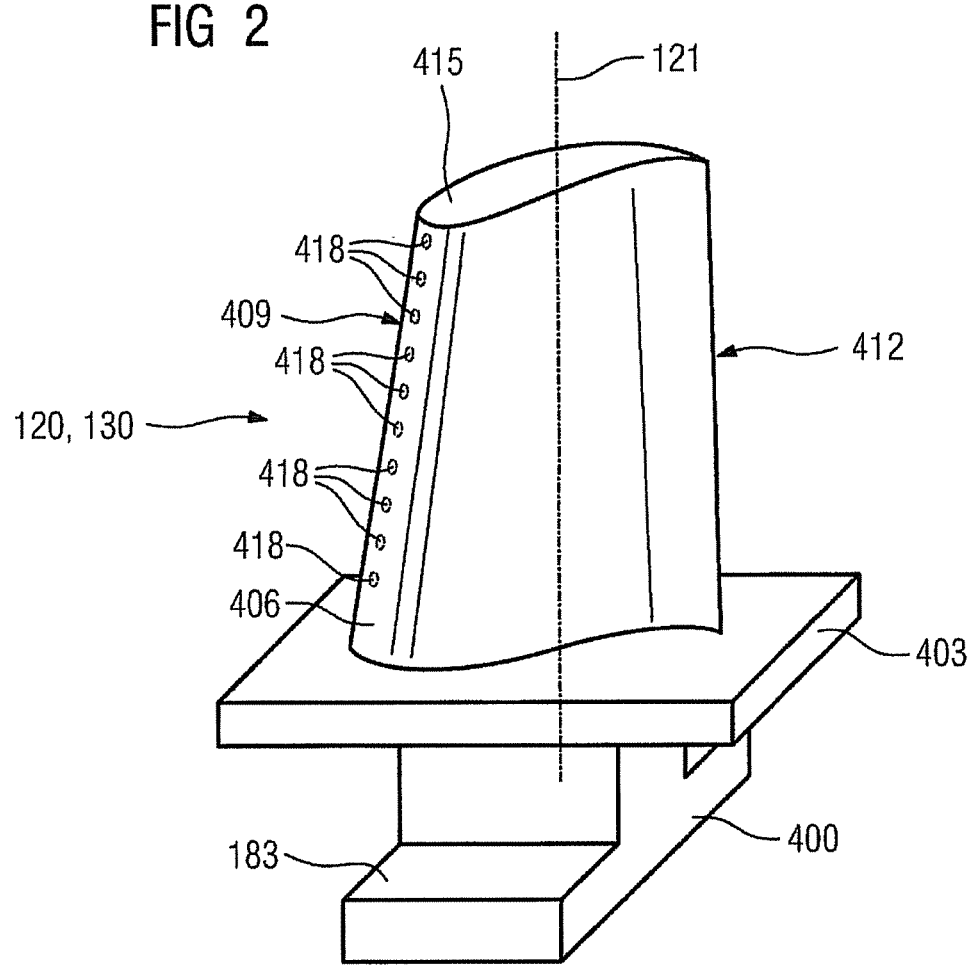
FIG. 2 shows a perspective view of a turbine blade or vane.

FIG. 2 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, in particular the superalloys according to FIG. 5, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloy.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024, 792 and EP 0 892 090 A1; these documents form part of the disclosure with regard to the solidification process.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-base protective coatings, it is also preferable to use nickel-base protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

Figure 3:
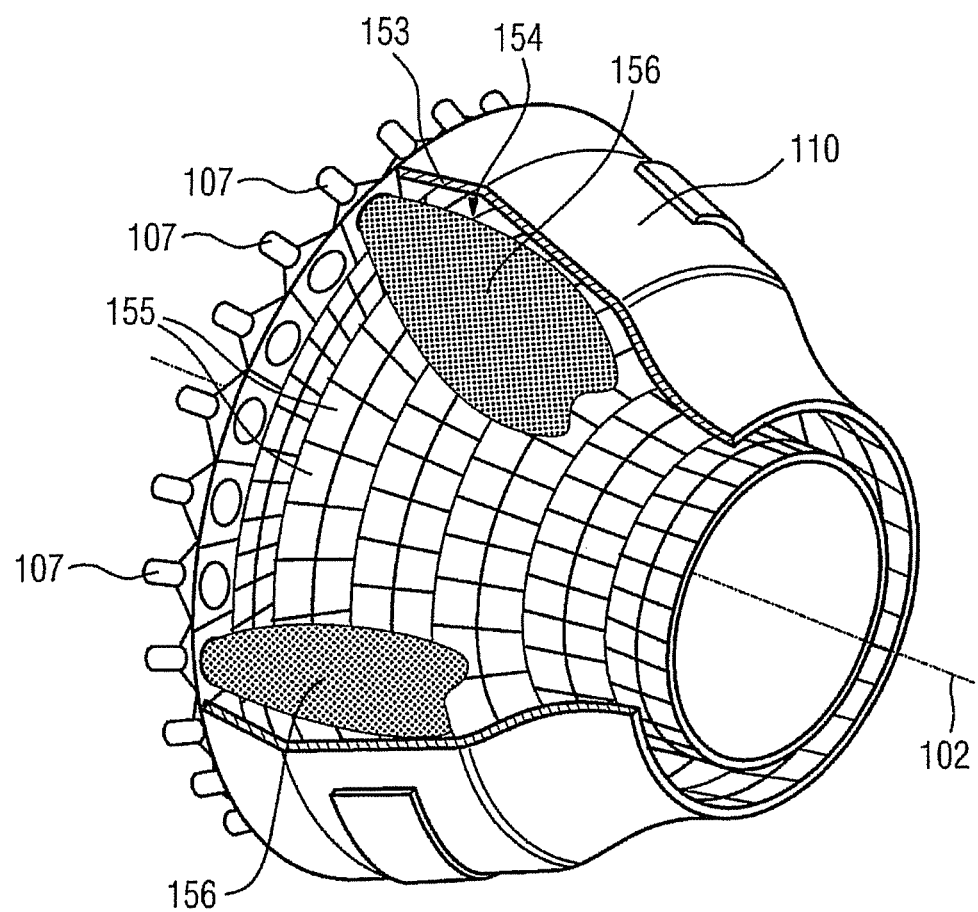
FIG. 3 shows a perspective view of a combustion chamber.

FIG. 3 shows a combustion chamber 110 of a gas turbine. The combustion chamber 110 is configured, for example, as what is known as an annular combustion chamber, in which a multiplicity of burners 107, which generate flames 156, arranged circumferentially around the axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth element or hafnium (Hf). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

It is also possible for a, for example, ceramic thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks.

Refurbishment means that after they have been used, protective layers may have to be removed from heat shield elements 155 (e.g. by sand-blasting). Then, the corrosion and/or oxidation layers and products are removed. If appropriate, cracks in the heat shield element 155 are also repaired. This is followed by recoating of the heat shield elements 155, after which the heat shield elements 155 can be reused.

Moreover, a cooling system may be provided for the heat shield elements 155 and/or their holding elements, on account of the high temperatures in the interior of the combustion chamber 110. The heat shield elements 155 are then, for example, hollow and may also have cooling holes (not shown) opening out into the combustion chamber space 154.

Figure 4:
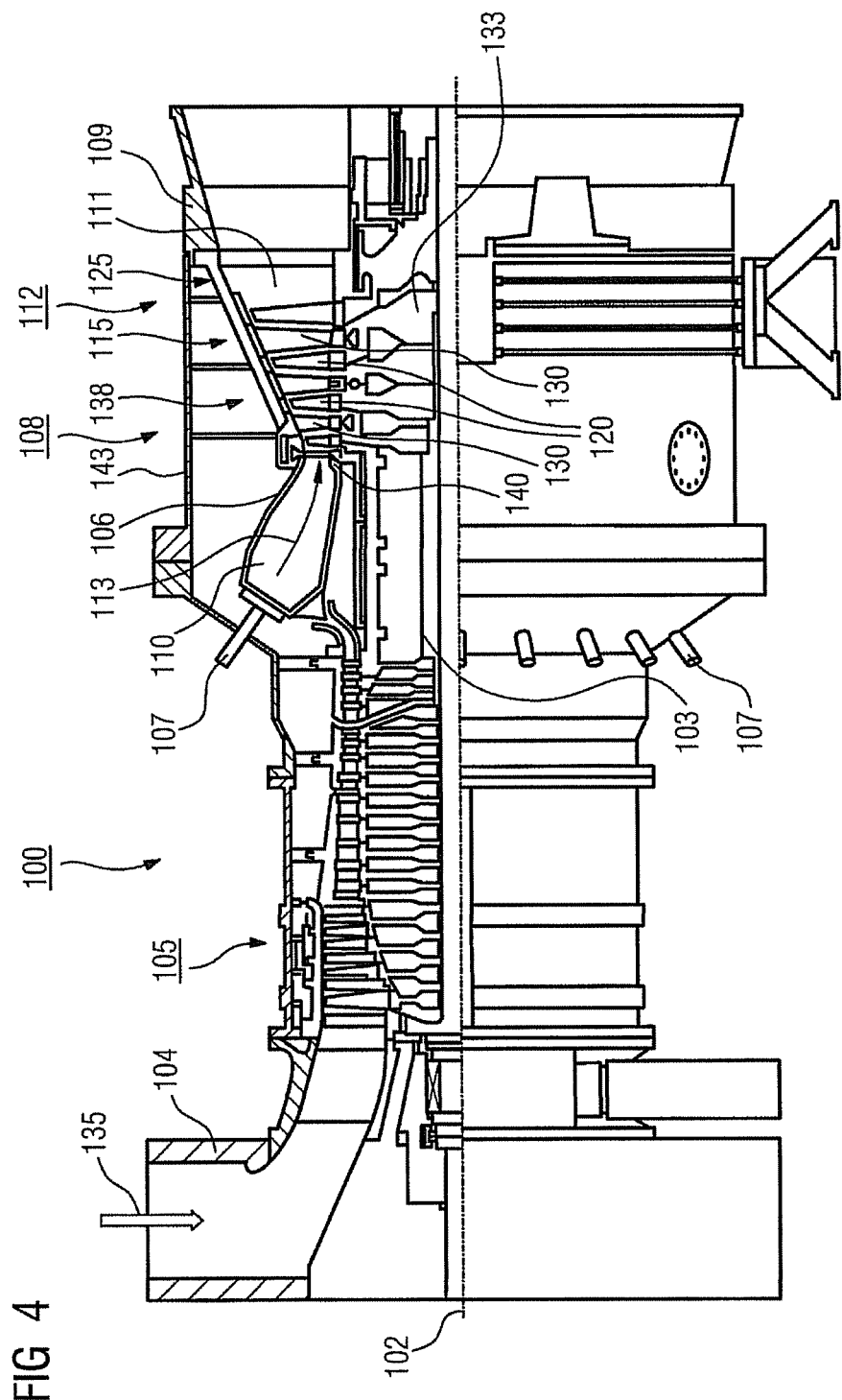
FIG. 4 shows a gas turbine.

FIG. 4 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-base, nickel-base or cobalt-base superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloys.

The blades or vanes 120, 130 may also have coatings which protect against corrosion (MCrAlX; M is at least one element selected from the group consisting of iron (Fe), cobalt (Co), nickel (Ni), X is an active element and stands for yttrium (Y)

and/or silicon, scandium (Sc) and/or at least one rare earth element or hafnium). Alloys of this type are known from EP0 486 489 B1, EP0 786 017 B1, EP0 412 397 B1 or EP 1 306 454 A1, which are intended to form part of the present disclosure with regard to the chemical composition.

A thermal barrier coating, consisting for example of $ZrO_2$, $Y_2O_3$—$ZrO_2$, i.e. unstabilized, partially stabilized or fully stabilized by yttrium oxide and/or calcium oxide and/or magnesium oxide, may also be present on the MCrAlX.

Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

The invention claimed is:

1. A solder alloy, consisting of:
   germanium;
   a nickel balance, and
   at least one element selected from the group consisting of:
   cobalt;
   tungsten, and
   wherein the solder alloy is selected from one of the following compositions,
   where G=Ge;
   Ni—Co-G;
   Ni—W-G; and
   Ni—Co—W-G,
   wherein the solder alloy does not comprise any of the following elements: silicon, carbon, iron, manganese, boron, and zirconium, and wherein a germanium content is ≥3% by weight to 28% by weight.

2. The solder allow as claimed in claim 1,
   wherein a germanium content is 18% by weight to 28% by weight.

3. The solder alloy as claimed in claim 1, wherein the solder alloy contains at least 0.1% by weight of an element selected from the group consisting of: cobalt, and tungsten.

4. The solder alloy as claimed in claim 1,
   wherein the nickel has the highest proportion by weight, or wherein the nickel has the highest proportion by volume.

5. The solder alloy as claimed in claim 1,
   wherein a tungsten content is 2% by weight to 6% by weight.

6. The solder alloy as claimed in claim 1,
   wherein a cobalt content is 2% by weight to 10% by weight.

7. A solder alloy, consisting of:
   germanium;
   a nickel balance, and
   cobalt as an optional element, and
   tungsten, and
   wherein the solder alloy is selected from one of the following compositions, where G=Ge:
   Ni—W-G; and
   Ni—Co—W-G,
   wherein the solder alloy does not comprise any of the following elements: silicon, carbon, iron, manganese, boron, and zirconium, and
   wherein a tungsten content is 2% by weight to 6% by weight.

* * * * *